(12) United States Patent
Kawata et al.

(10) Patent No.: US 10,023,235 B2
(45) Date of Patent: Jul. 17, 2018

(54) AUTOMOBILE BODY AND METHOD FOR MANUFACTURING AUTOMOBILE BODY

(71) Applicant: HONDA MOTOR CO., LTD., Minato-Ku, Tokyo (JP)

(72) Inventors: Takahira Kawata, Wako (JP); Minoru Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 15/511,115

(22) PCT Filed: Jun. 9, 2015

(86) PCT No.: PCT/JP2015/066619
§ 371 (c)(1),
(2) Date: Mar. 14, 2017

(87) PCT Pub. No.: WO2016/042858
PCT Pub. Date: Mar. 24, 2016

(65) Prior Publication Data
US 2017/0253274 A1    Sep. 7, 2017

(30) Foreign Application Priority Data
Sep. 18, 2014 (JP) .................................. 2014-189697

(51) Int. Cl.
*B62D 23/00* (2006.01)
*B62D 25/06* (2006.01)
(Continued)

(52) U.S. Cl.
CPC ........... *B62D 23/005* (2013.01); *B62D 25/04* (2013.01); *B62D 25/06* (2013.01); *B62D 25/14* (2013.01);
(Continued)

(58) Field of Classification Search
CPC ...... B62D 23/005; B62D 25/04; B62D 25/06; B62D 25/14; B62D 29/046; B62D 65/04; B62D 24/065
See application file for complete search history.

(56) References Cited

U.S. PATENT DOCUMENTS 6,883,857 B2    4/2005   Steinhauser et al.

FOREIGN PATENT DOCUMENTS

JP    H01-103586 A    4/1989
JP    2004-034977 A   2/2004
(Continued)

*Primary Examiner* — D Glenn Dayoan
*Assistant Examiner* — Melissa A Black
(74) *Attorney, Agent, or Firm* — Carrier Blackman & Associates, P.C.; Joseph P. Carrier; William D. Blackman

(57) ABSTRACT

An automobile body and a method for manufacturing the same is provided in which a substantially rectangular windshield joining face is formed by a front roof arch, a front portion of roof side rails and a dash panel upper of a lower skeleton. Since the upper skeleton and the lower skeleton can be separated, there is the problem that a gap occurs between lower ends of the roof side rails of the upper skeleton and the vehicle width direction outer ends of the dash panel upper of the lower skeleton, and the windshield joining face is discontinuous. Extension parts are provided inward in the vehicle width direction from the lower ends of the roof side rails, and the vehicle width direction inner ends of the extension parts are connected to the vehicle width direction outer ends of the dash panel upper, thereby eliminating discontinuity of the windshield joining face.

7 Claims, 8 Drawing Sheets

(51) Int. Cl.
 *B62D 27/06* (2006.01)
 *B62D 29/04* (2006.01)
 *B62D 65/04* (2006.01)
 *B62D 25/04* (2006.01)
 *B62D 25/14* (2006.01)

(52) U.S. Cl.
 CPC ......... *B62D 27/065* (2013.01); *B62D 29/046* (2013.01); *B62D 65/04* (2013.01)

(56) References Cited

FOREIGN PATENT DOCUMENTS

| | | |
|---|---|---|
| JP | 2008-037123 A | 2/2008 |
| JP | 2011-088495 A | 5/2011 |
| JP | 2012-162098 A | 8/2012 |

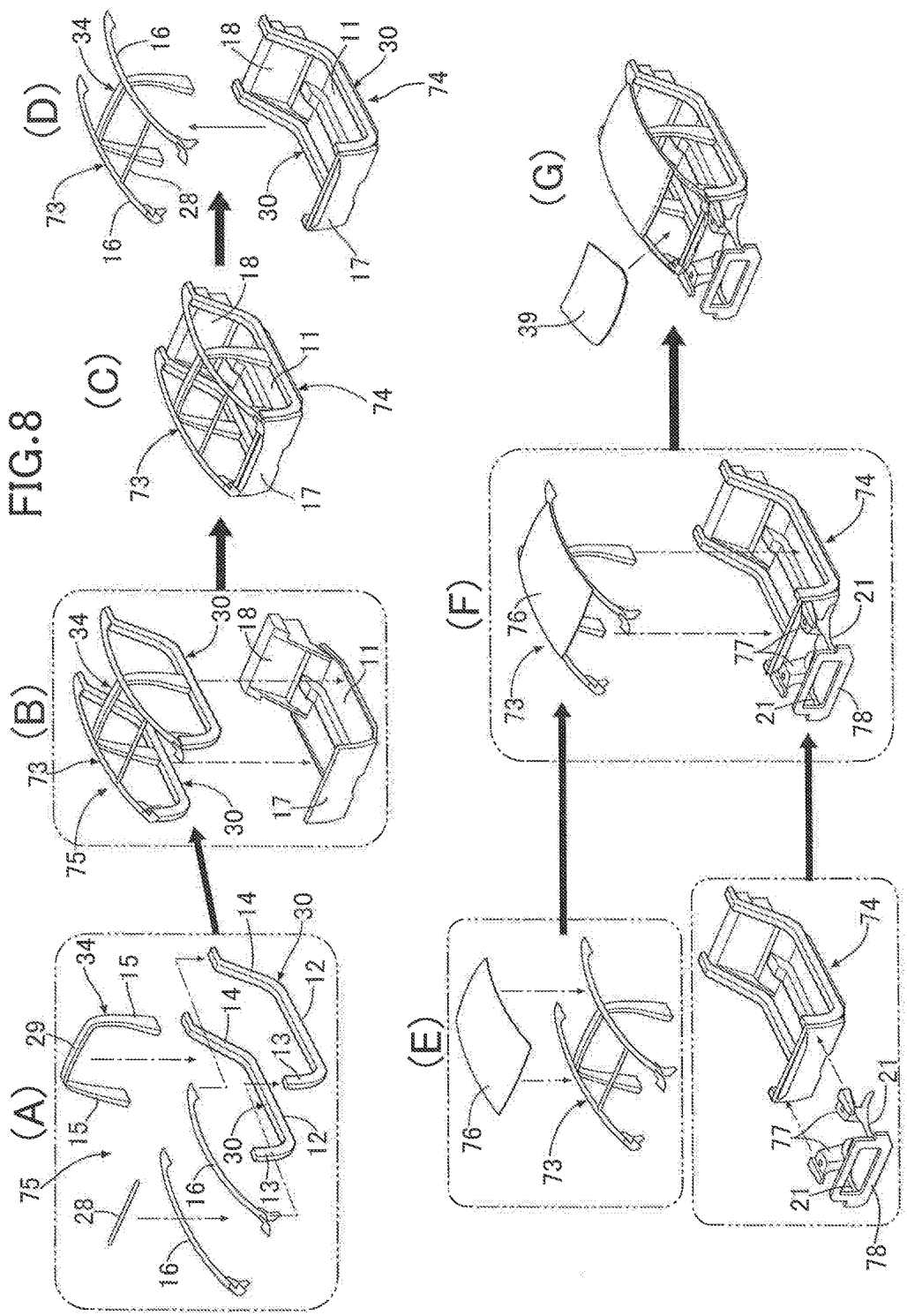

AUTOMOBILE BODY AND METHOD FOR MANUFACTURING AUTOMOBILE BODY

TECHNICAL FIELD

The present invention relates to an automobile body in which a lower skeleton that is formed into a bathtub shape using a CFRP and includes at least a dash panel upper and an upper skeleton that includes at least a front roof arch and a pair of left and right roof side rails are formed so that the lower skeleton and the upper skeleton can be separated from each other, and a rectangular windshield joining face that supports a windshield is formed so as to straddle the dash panel upper, the pair of left and right roof side rails, and the front roof arch, and a method for manufacturing the automobile body.

BACKGROUND ART

A fiber-reinforced resin automobile body that includes a front panel structure, a floor structure, and a rear panel structure, in which a rectangular windshield frame supporting a windshield is formed integrally with the front panel structure is known from Patent Document 1 below.

RELATED ART DOCUMENTS

Patent Documents

Patent Document 1: Japanese Patent Application Laid-open No. 2004-34977

SUMMARY OF THE INVENTION

Problems to be Solved by the Invention

When a lower skeleton that is formed into a bathtub shape using a CFRP (carbon fiber-reinforced plastic) and includes at least a dash panel upper and an upper skeleton that includes at least a front roof arch and a pair of left and right roof side rails (front pillar uppers) are formed so that they can be separated from each other, as in the vehicle body structure described in Patent Document 1 above, when the windshield frame is formed integrally with the lower skeleton, there is the problem that the upper skeleton integrally including the front roof arch forming the upper edge of the windshield frame and the roof side rails forming left and right edges cannot be separated from the lower skeleton.

In order to avoid this problem, if the lower end of the roof side rail on the upper skeleton side and the vehicle width direction outer end of the dash panel upper on the lower skeleton side are divided so that they can be separated, the joining face of the windshield is discontinuous in this portion, and there is a possibility that the strength with which the windshield is supported will deteriorate.

The present invention has been accomplished in light of the above circumstances, and it is an object thereof to form a joining face of a windshield so that it is seamless over the entire periphery while enabling a lower skeleton and an upper skeleton to be separated.

Means for Solving the Problems

In order to attain the above object, according to a first aspect of the present invention, there is provided an automobile body in which a lower skeleton that is formed into a bathtub shape using a CFRP and comprises at least a dash panel upper and an upper skeleton that comprises at least a front roof arch and a pair of left and right roof side rails are formed so that the lower skeleton and the upper skeleton can be separated from each other, and a rectangular windshield joining face that supports a windshield is formed so as to straddle the dash panel upper, the pair of left and right roof side rails, and the front roof arch, wherein a pair of left and right extension parts that extend toward a vehicle width direction inner side and are connected to vehicle width direction outer ends of the dash panel upper are provided at lower ends of the pair of left and right roof side rails, and a windshield joining face that supports part of the windshield is formed on the pair of left and right extension parts.

Further, according to a second aspect of the present invention, in addition to the first aspect, the extension part comprises an L-shaped first wall face that has a first portion extending in the vehicle width direction and a second portion extending in a fore-and-aft direction and is disposed in parallel to the windshield, a second wall face that extends downward from the first portion of the first wall face, and a third wall face that extends downward from the second portion of the first wall face, the first wall face and the third wall face are fixed to a metal joint that is provided on the lower skeleton and supports a front end of the roof side rail, and part of the windshield is supported on the first wall face.

Furthermore, according to a third aspect of the present invention, in addition to the second aspect, the lower skeleton comprises a dash panel lower, the dash panel upper is glued to an upper end of the dash panel lower, and the extension part abuts against the upper end of the dash panel lower via a sealing material.

Moreover, according to a fourth aspect of the present invention, in addition to the third aspect, a vertical wall and a horizontal wall are formed at the vehicle width direction outer end of the dash panel upper, the vertical wall extending downward and the horizontal wall extending outside in the vehicle width direction from the lower end of the vertical wall, and the extension part engages with the vertical wall and the horizontal wall via a latching claw and abuts against the vertical wall via a sealing material.

Further, according to a fifth aspect of the present invention, in addition to the third or fourth aspect, the lower skeleton comprises a front pillar lower that is fixed to a rear face of the dash panel lower, and the metal joint is fastened by a bolt so as to straddle a front metal bracket that is provided on a front face of the dash panel lower and a rear metal bracket that is provided on a rear face of the front pillar lower.

Furthermore, according to a sixth aspect of the present invention, in addition to any one of the first to fifth aspects, the method comprising a step of separating the upper skeleton from the lower skeleton, a step of assembling a component to each of the separated upper skeleton and lower skeleton, and a step of re-bolting together the upper skeleton and the lower skeleton, to which the assembling of the component has been completed.

It should be noted here that a front metal joint 62 of an embodiment corresponds to the metal joint of the present invention, and a front bolt 65 and a rear bolt 67 of the embodiment correspond to the bolt of the present invention.

Effects of the Invention

In accordance with the first aspect of the present invention, with regard to the automobile body, the lower skeleton formed into a bathtub shape using a CFRP and including at least the dash panel upper and the upper skeleton including at least the front roof arch and the pair of left and right roof side rails are formed so that they can be separated from each other, and the rectangular windshield joining face supporting the windshield is formed so as to straddle the dash panel upper, the pair of left and right roof side rails, and the front roof arch.

Since the pair of left and right extension parts extending toward the vehicle width direction inner side and connected to the vehicle width direction outer ends of the dash panel upper are provided at lower ends of the pair of left and right roof side rails, and the windshield joining face supporting part of the windshield is formed on the pair of left and right extension parts, even if the lower skeleton and the upper skeleton are formed so that they can be separated from each other, it is possible to seamlessly form a windshield joining face that can support the entire periphery of the windshield.

Furthermore, in accordance with the second aspect of the present invention, since the extension part includes the L-shaped first wall face, which is disposed in parallel to the windshield and has the first portion extending in the vehicle width direction and the second portion extending in the fore-and-aft direction, and part of the windshield is supported on the first wall face, it is possible to make the joining face of the windshield continuous from the roof side rail to the dash panel upper. Moreover, since the extension part includes the second wall face extending downward from the first portion of the first wall face and the third wall face extending downward from the second portion of the first wall face, and the first wall face and the third wall face are fixed to the metal joint provided on the lower skeleton and supporting the front end of the roof side rail, it is possible to strongly fix the extension part to the metal joint, thus enhancing the strength with which the windshield is supported.

Moreover, in accordance with the third aspect of the present invention, since the lower skeleton includes the dash panel lower, the dash panel upper is glued to the upper end of the dash panel lower, and the extension part abuts against the upper end of the dash panel lower via the sealing material, it is possible to ensure waterproofing between an engine compartment and a cabin.

Furthermore, in accordance with the fourth aspect of the present invention, since the vertical wall extending downward and the horizontal wall extending outward in the vehicle width direction from the lower end of the vertical wall are formed at the outer end in the vehicle width direction of the dash panel upper, the extension part engages with the vertical wall and the horizontal wall via the latching claw and abuts against the vertical wall via the sealing material, it is easy to position the extension part with respect to the dash panel upper and it is possible to ensure waterproofing between the engine compartment and the cabin.

Moreover, in accordance with the fifth aspect of the present invention, since the lower skeleton includes the front pillar lower fixed to the rear face of the dash panel lower, and the metal joint is fastened by means of the bolt so as to straddle the front metal bracket provided on the front face of the dash panel lower and the rear metal bracket provided on the rear face of the front pillar lower, it is possible to strongly fix the metal joint to the lower skeleton, thus enhancing the strength with which the front end of the roof side rail is supported.

Furthermore, in accordance with the sixth aspect of the present invention, since the upper skeleton is separated from the lower skeleton, a component is assembled to the upper skeleton and the lower skeleton, which have been separated, and the upper skeleton and the lower skeleton, to which the component has been assembled, are re-bolted together, the lower skeleton does not interfere when a component is assembled to the upper skeleton, and the upper skeleton does not interfere when a component is assembled to the lower skeleton, thus not only improving the productivity, but also enabling joining and separation of the upper skeleton and the lower skeleton to be easily carried out due to them being bolted together.

BRIEF DESCRIPTION OF DRAWINGS

FIG. 8 is a diagram for explaining steps of assembling the automobile body. (first embodiment)

EXPLANATION OF REFERENCE NUMERALS AND SYMBOLS

Figure 1:
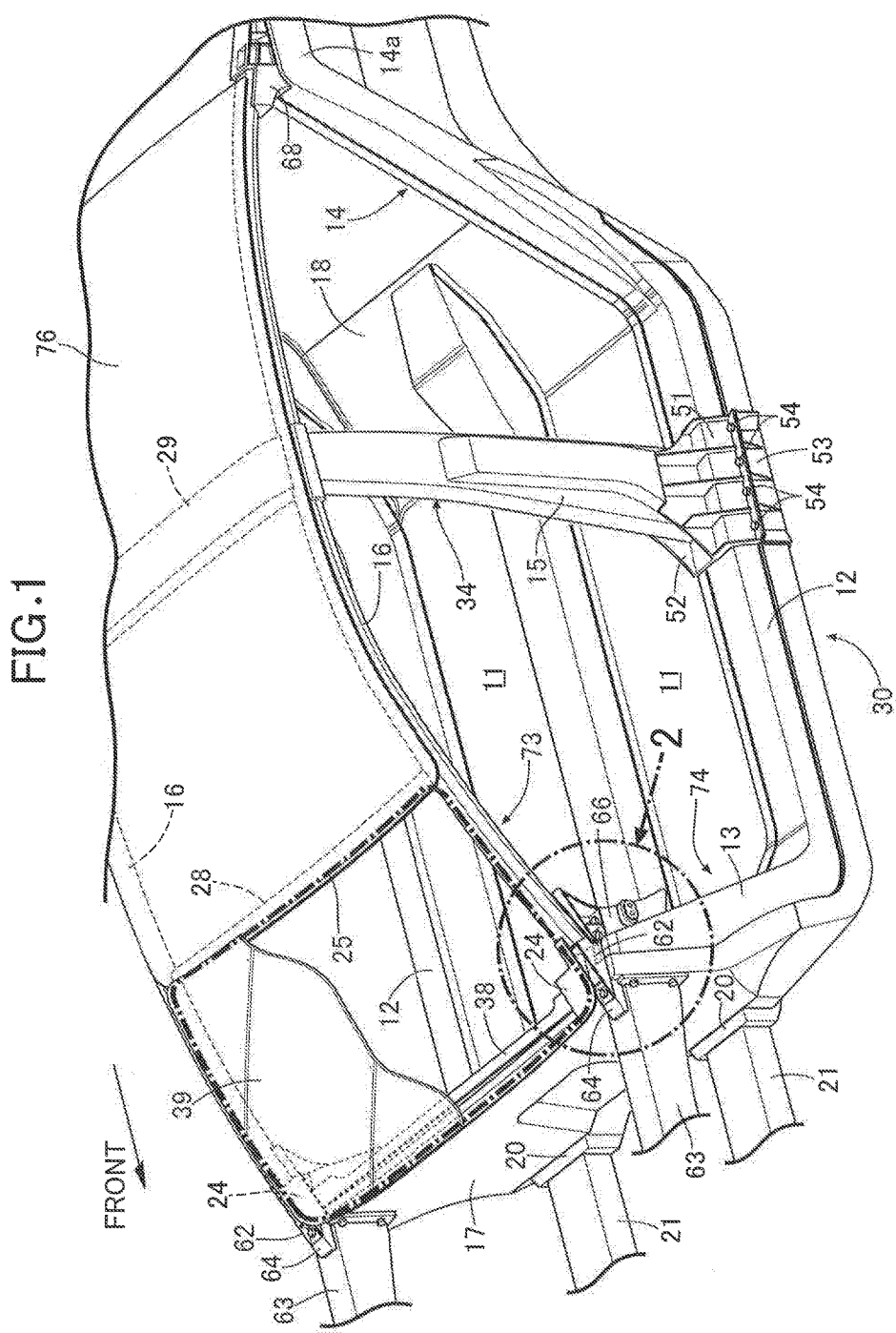
FIG. 1 is a perspective view when an automobile body is viewed obliquely from the front. (first embodiment)

13 Front pillar lower
16 Roof side rail
17 Dash panel lower
24 Extension part
24a First wall face
24b Second wall face
24c Third wall face
24e Latching claw
24f Latching claw
24g Windshield joining face
25 Windshield joining face
26 Sealing material
27 Sealing material
28 Front roof arch
38 Dash panel upper
38b Vertical wall
38c Horizontal wall
39 Windshield
62 Front metal joint (metal joint)
64 Front metal bracket
65 Front bolt (bolt)
66 Rear metal bracket
67 Rear bolt (bolt)
73 Upper skeleton
74 Lower skeleton
a First portion
b Second portion

MODES FOR CARRYING OUT THE INVENTION

An embodiment of the present invention is explained below by reference to FIG. 1 to FIG. 8. In the present specification, the fore-and-aft direction, the left-and-right direction (vehicle width direction) and the vertical direction are defined with respect to an occupant seated on a driving seat.

First Embodiment

First, as shown in FIG. 1, an automobile body frame with a CFRP (carbon fiber-reinforced plastic) as a main material includes a vehicle body floor 11, a pair of left and right side sills 12 and 12 extending in the fore-and-aft direction along left and right side parts of the vehicle body floor 11, a pair of left and right front pillar lowers 13 and 13 rising upward to the front from front ends of the left and right side sills 12 and 12, a pair of left and right rear pillars 14 and 14 rising upward to the rear from rear ends of the left and right side sills 12 and 12, a pair of left and right center pillars 15 and 15 rising upward from intermediate parts in the fore-and-aft direction of the left and right side sills 12 and 12, and a pair of left and right roof side rails 16 and 16, made of an aluminum alloy pipe material, extending from upper ends of the left and right front pillar lowers 13 and 13 to upper ends of the left and right rear pillars 14 and 14 via upper ends of the left and right center pillars 15 and 15. The side sill 12, the front pillar lower 13, and the rear pillar 14 are formed as a unit and form a side member 30.

The left and right roof side rails 16 and 16 are connected by means of a front roof arch 28 and a middle roof arch 29. The upper ends of the left and right center pillars 15 and 15 and opposite ends in the vehicle width direction of the middle roof arch 29 are integrally continuous, forming an inverted U-shaped roll bar 34 when viewed from the front. Front parts of the roof side rails 16 and 16 connected to the upper ends of the front pillar lowers 13 and 13 form a front pillar upper. The integrated left and right roof side rails 16 and 16, roll bar 34, front roof arch 28, etc. form an upper skeleton 73 (see FIG. 8 (D)).

A flat plate-shaped dash panel lower 17 is joined to the front end of the vehicle body floor 11 and front faces of the left and right front pillar lowers 13 and 13, and a flat plate-shaped rear partition wall 18 is joined to the rear end of the vehicle body floor 11 and rear faces of the left and right rear pillars 14 and 14. The integrated vehicle body floor 11, dash panel lower 17, rear partition wall 18, and left and right side members 30 and 30 form a lower skeleton 74 (see FIG. 8 (D)), and the upper skeleton 73 and the lower skeleton 74 can be detached from each other. A pair of left and right mounting pedestals 20 and 20, made of an aluminum alloy casting, are fixed to the front end of the vehicle body floor 11, and rear ends of a pair of left and right front side frames 21 and 21, made of an aluminum alloy casting, are fixed to front ends of the mounting pedestals 20 and 20.

Lower ends of the left and right center pillars 15 of the roll bar 34 are fastened to an intermediate part in the fore-and-aft direction of the side sill 12 of the side member 30 via an upper outer joint 51, an upper inner joint 52, and a lower joint 53 by means of bolts 54. Therefore, loosening the bolts 54 enables the roll bar 34 to be separated from the side member 30.

A dash panel upper 38 extending in the vehicle width direction is fixed along the upper end of the dash panel lower 17, and an outer peripheral part of a windshield 39 is glued to a rectangular frame-shaped opening formed from front parts (front pillar upper) of the pair of left and right roof side rails 16 and 16, and the front roof arch 28 on the upper skeleton 73 side and the dash panel upper 38 on the lower skeleton 74 side.

The structure of a part where the front end of the roof side rail 16 and the vehicle width direction outer end of the dash panel upper 38 are connected is now explained in detail by reference to FIG. 2 to FIG. 7.

Figure 2:
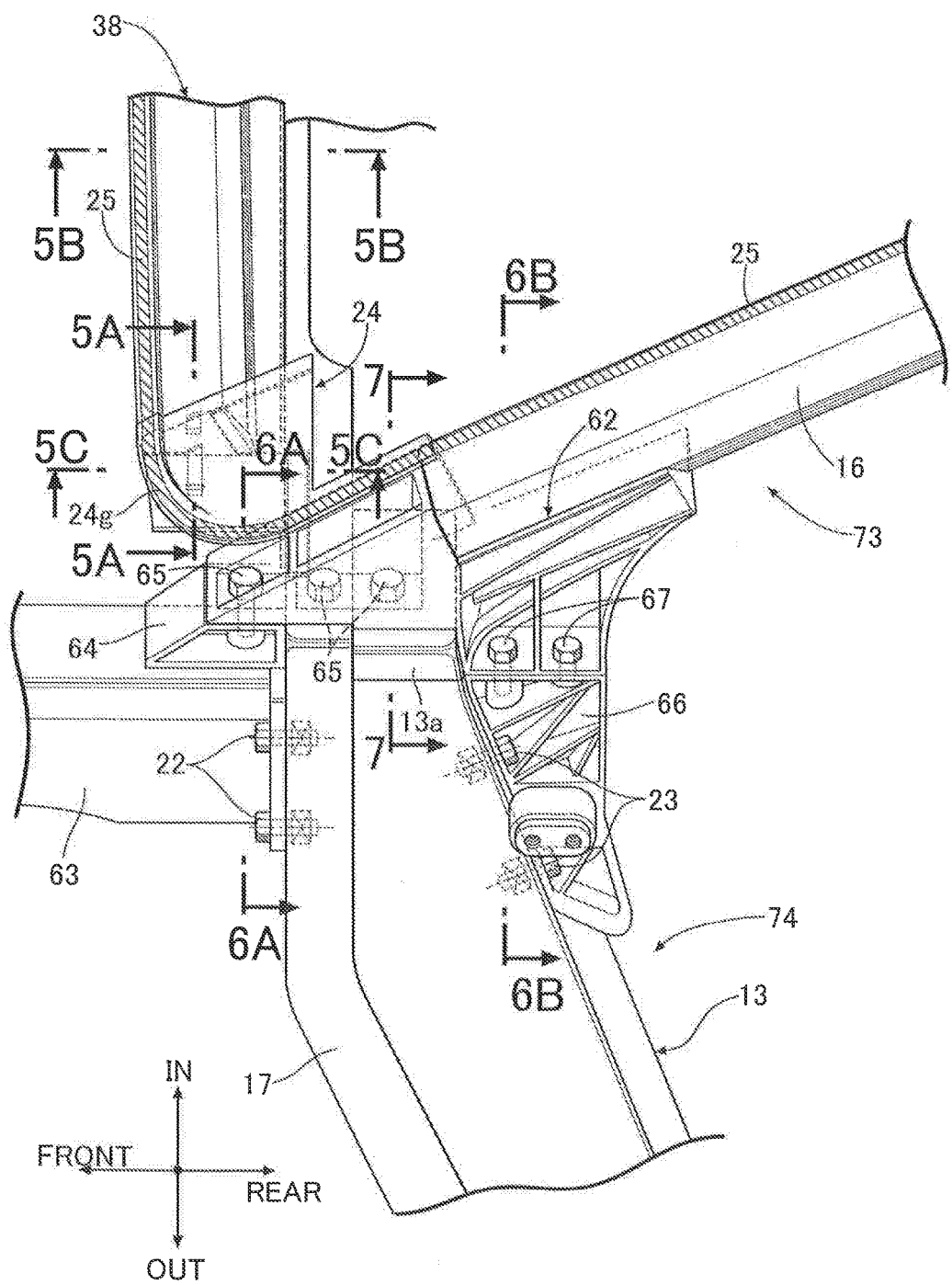
FIG. 2 is an enlarged view of part 2 in FIG. 1. (first embodiment)
Figure 3:
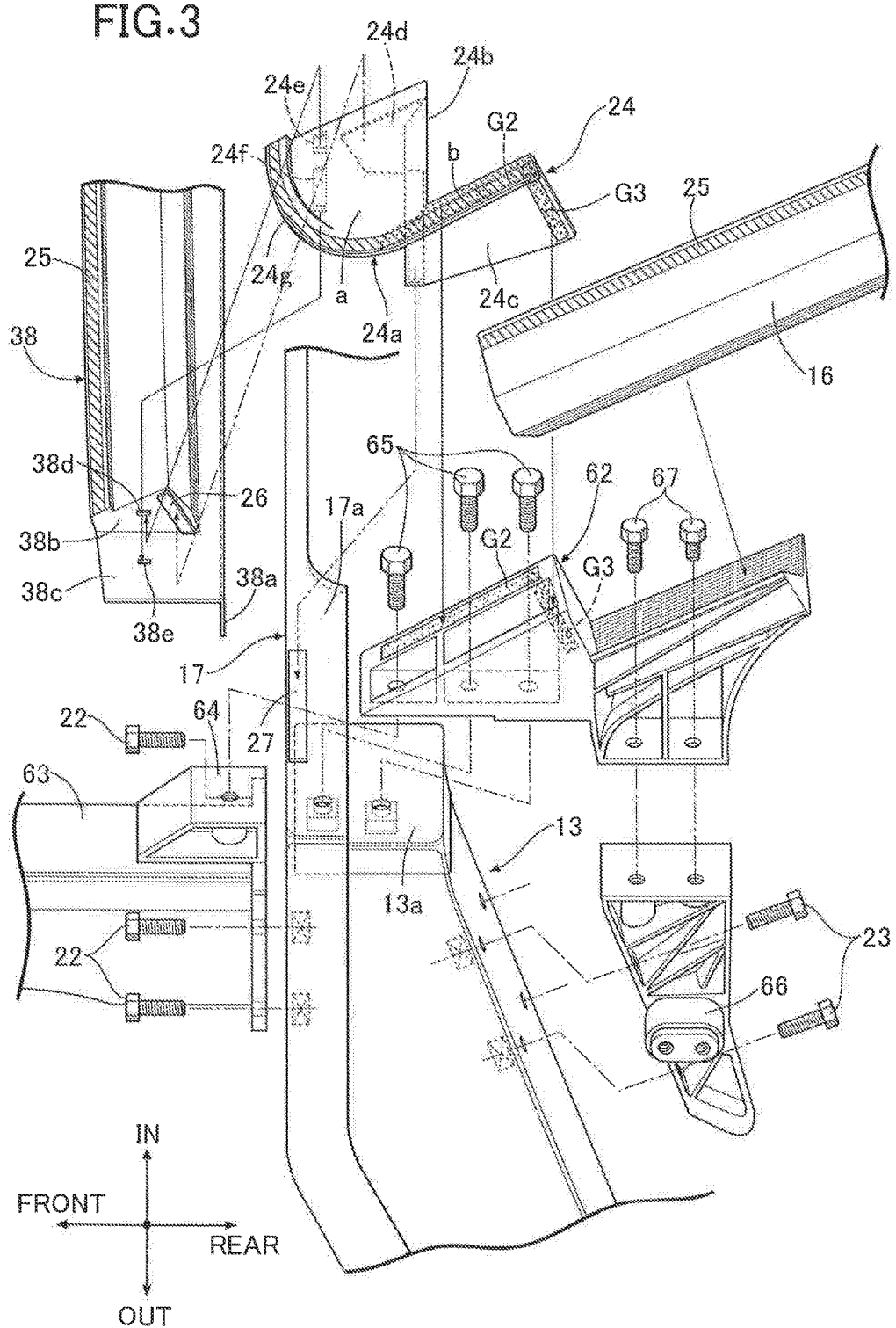
FIG. 3 is an exploded view corresponding to FIG. 2. (first embodiment)

As shown in FIG. 2 and FIG. 3, a front metal joint 62 made of an aluminum alloy casting is welded to the front end of the roof side rail 16. A front metal bracket 64 made of an aluminum alloy casting supporting the rear end of an upper member 63 is fixed to a front face of the dash panel lower 17 by means of bolts 22, and a front part of the front metal joint 62 is fastened to an upper face of the front metal bracket 64 and an upper face of a lid member 13a covering an upper face of the front pillar lower 13 by means of front bolts 65 (see FIG. 6 (A) and FIG. 7). Furthermore, a rear metal bracket 66 made of an aluminum alloy casting is fixed to a rear face of the front pillar lower 13 by means of bolts 23, and a rear part of the front metal joint 62 is fastened to an upper face of the rear metal bracket 66 by means of rear bolts 67 (see FIG. 6 (B)).

In addition, a rear metal joint 68 made of an aluminum alloy casting (see FIG. 1) is welded to the rear end of the roof side rail 16, and this rear metal joint 68 is detachably fastened to an upper wall of a portion 14a extending to the rear of the upper end of the rear pillar 14 by means of a bolt, which is not illustrated.

Figure 4:
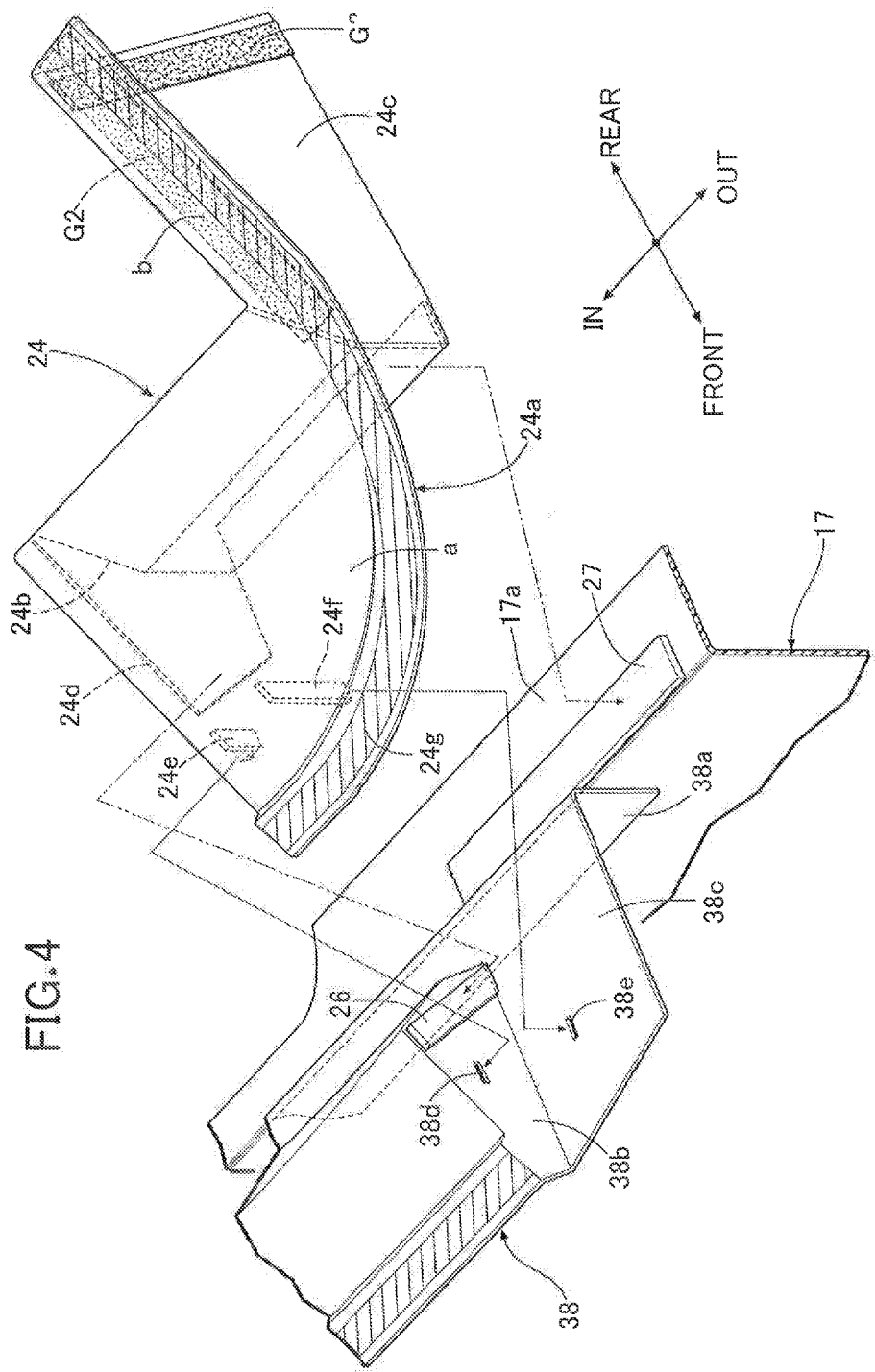
FIG. 4 is an enlarged view of part of FIG. 3. (first embodiment)

As shown in FIG. 2 to FIG. 4, with regard to the dash panel upper 38, a rear wall 38a formed by bending its rear end downward is glued to a front face of an upper end part of the dash panel lower 17. A vertical wall 38b formed by bending downward and a horizontal wall 38c formed by bending the lower end of the vertical wall 38b outward in the vehicle width direction are formed on a vehicle width direction end part of the dash panel upper 38, and latching holes 38d and 38e are formed in the vertical wall 38b and the horizontal wall 38c respectively.

In order to connect the front metal joint 62 welded to the lower end of the roof side rail 16 to the vehicle width direction outer end of the dash panel upper 38, an extension part 24 projecting inward in the vehicle width direction from the front metal joint 62 includes an L-shaped first wall face 24a that has a first portion a extending in the vehicle width direction and a second portion b extending in the fore-and-aft direction and is disposed in parallel to the windshield 39, a second wall face 24b extending downward from the rear end of the first portion a of the first wall face 24a, a third wall face 24c extending downward from the vehicle width direction inner end of the second portion b of the first wall face 24a, and a fourth wall face 24d extending downward from the vehicle width direction inner end of the first portion a of the first wall face 24a, and two latching claws 24e and 24f project downward from a lower face of the first portion a of the first wall face 24a.

A windshield joining face 24g curved into an arc shape (see the hatched part in FIG. 4) is formed on the extension part 24 so as to extend from the front edge of the first wall face 24a to the outer edge in the vehicle width direction. Furthermore, a windshield joining face 25 is formed on the front roof arch 28, front parts of the pair of left and right roof side rails 16 and 16, and the dash panel upper 38, the windshield joining face 25 being continuous with the windshield joining faces 24g and 24g of the pair of left and right extension parts 24 and 24. This windshield joining face 25 is shown by the bold chain line in FIG. 1 and is shown by hatched lines in FIG. 2 to FIG. 4. An outer peripheral part of the windshield 39 is glued with a glue G1 to the windshield joining face 25 of the front roof arch 28, the front parts of the pair of left and right roof side rails 16 and 16, and the dash panel upper 38, and the windshield joining faces 24g and 24g of the pair of left and right extension parts 24 and 24 (see FIG. 5 (B) and FIG. 5 (C)).

Figure 7:
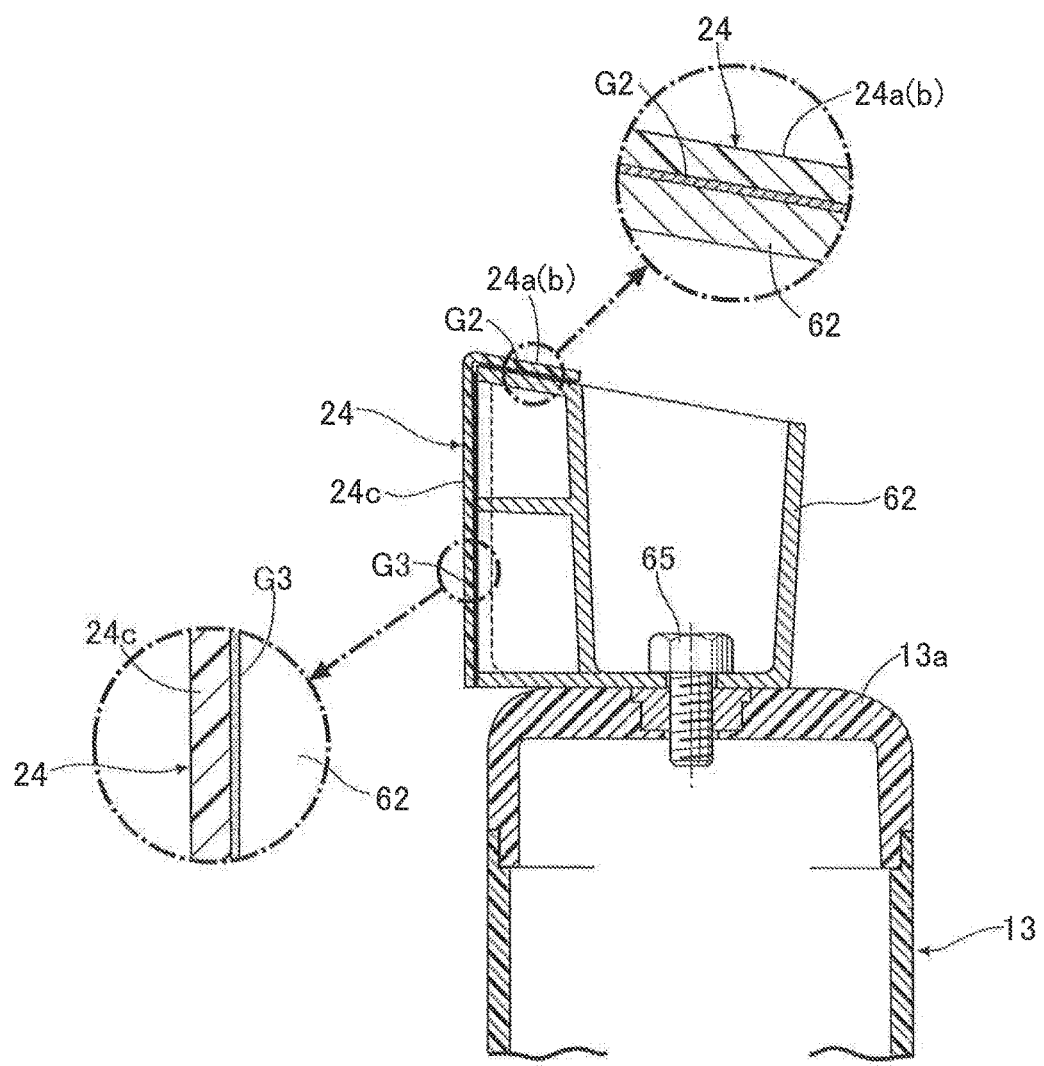
FIG. 7 is a sectional view along line 7-7 in FIG. 2. (first embodiment)

With regard to the extension part 24 thus formed, a lower face of the second portion b of the first wall face 24a is glued with a glue G2 to an upper face of the front metal joint 62 (see FIG. 3 and FIG. 7), and a vehicle width direction outer face of the third wall face 24c is glued with a glue G3 to a vehicle width direction inner face of the front metal joint 62 (see FIG. 3 and FIG. 7). When the upper skeleton 73 is joined to the lower skeleton 74, they are joined in a state in which the extension part 24 is positioned on the dash panel upper 38 by means of the two latching claws 24e and 24f projectingly provided on the lower face of the first portion a of the first wall face 24a of the extension part 24 engaging with the two latching holes 38d and 38e of the dash panel upper 38 respectively (see FIG. 4 and FIG. 5 (A)).

Figure 5:
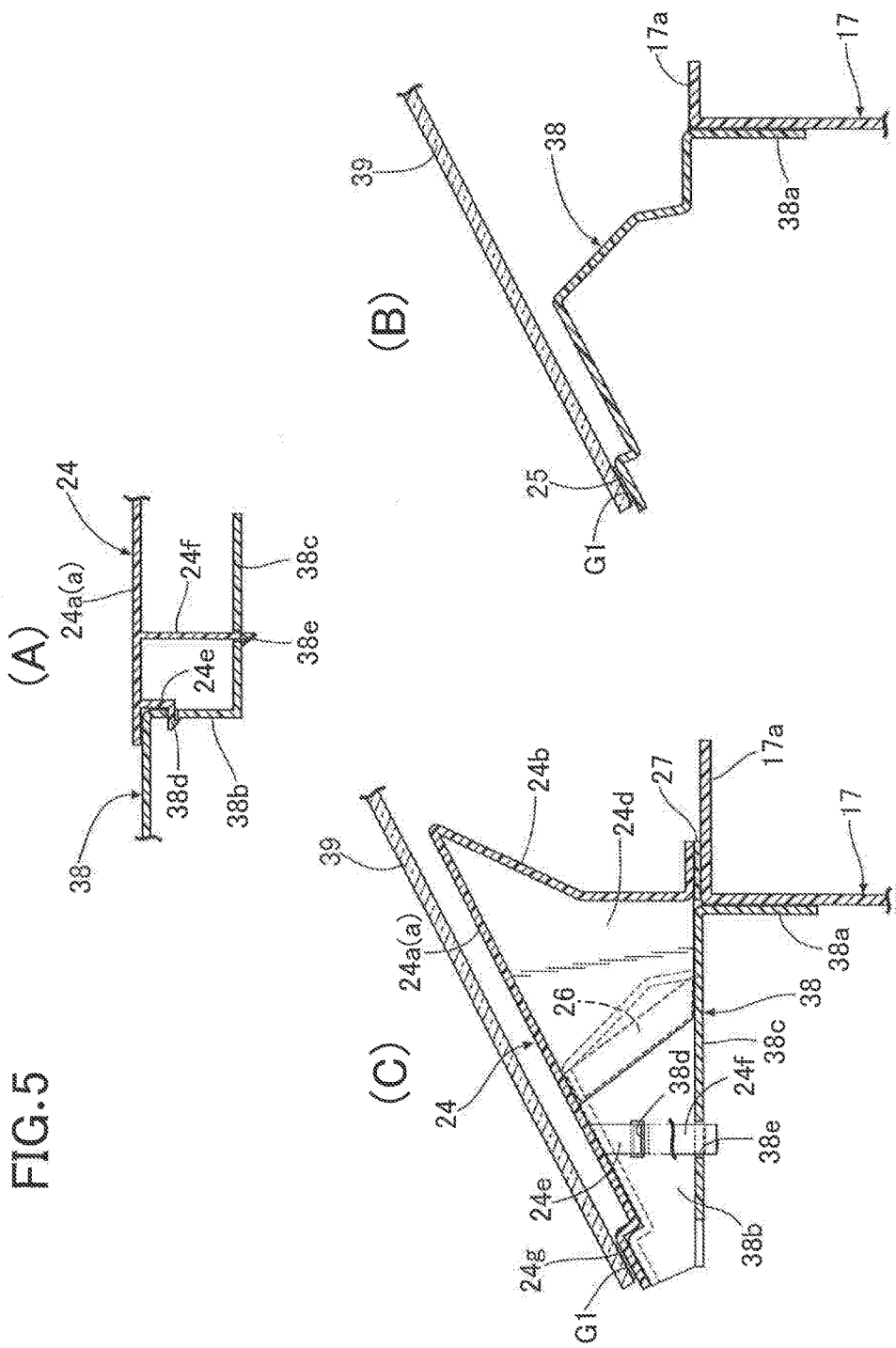
FIG. 5 is a sectional view along lines 5A-5A, 5B-5B and 5C-5C in FIG. 2. (first embodiment)
Figure 6:
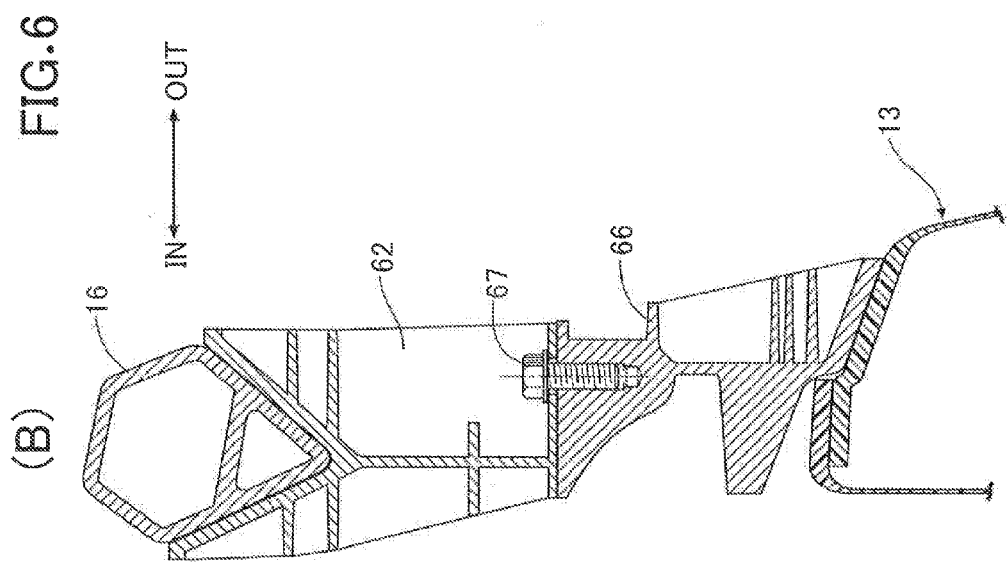
FIG. 6 is a sectional view along lines 6A-6A and 6B-6B in FIG. 2. (first embodiment)

In this state, a sealing material 26 is disposed between the fourth wall face 24d of the extension part 24 and the vertical wall 38b of the dash panel upper 38 (see FIG. 4 and FIG. 5 (C)), and a sealing material 27 is disposed between the lower end of the second wall face 24b of the extension part 24 and an upper face of the flange portion 17a formed by bending the upper end of the dash panel lower 17 to the rear (see FIG. 4 and FIG. 5 (C)).

The operation of the embodiment of the present invention having the above arrangement is now explained.

In a state in which the upper skeleton 73 and the lower skeleton 74 are joined, the substantially rectangular windshield joining face 25 (see FIG. 1) is formed from the front roof arch 28 and the front parts (front pillar upper) of the pair of left and right roof side rails 16 and 16 of the upper skeleton 73, and the dash panel upper 38 of the lower skeleton 74. In this arrangement, since the upper skeleton 73 and the lower skeleton 74 can be separated, there is the problem that a gap occurs between lower ends of the pair of left and right roof side rails 16 and 16 of the upper skeleton 73 and the vehicle width direction outer ends of the dash panel upper 38 of the lower skeleton 74, and the windshield joining face 25 is discontinuous. However, in accordance with the present embodiment, since the pair of left and right extension parts 24 and 24 are projectingly provided inward in the vehicle width direction from the lower ends of the pair of left and right roof side rails 16 and 16 of the upper skeleton 73, and the vehicle width direction inner ends of the extension parts 24 and 24 are connected to the vehicle width direction outer ends of the dash panel upper 38, it is possible to eliminate discontinuity of the windshield joining face 25 by means of the windshield joining faces 24g and 24g of the extension parts 24 and 24, thereby enabling the windshield 39 to be glued over its entire periphery (see FIG. 2).

Furthermore, since the extension part 24 includes the L-shaped first wall face 24a, which is disposed in parallel to the windshield 39 and has the first portion a extending in the vehicle width direction and the second portion b extending in the fore-and-aft direction, and part of the windshield 39 is supported on the windshield joining face 24g formed on the first wall face 24a, it is possible to make the joining face 25 of the windshield 39 continuous from the roof side rail 16 to the dash panel upper 38. Moreover, since the extension part 24 includes the second wall face 24b extending downward from the first portion a of the first wall face 24a and the third wall face 24c extending downward from the second portion b of the first wall face 24a, and the first wall face 24a and the third wall face 24c are glued with glue G2 and G3 to the front metal joint 62 provided on the lower skeleton 74 and supporting the front end of the roof side rail 16 (see FIG. 3), it is possible to strongly fix the extension part 24 to the front metal joint 62, thus enhancing the strength with which the windshield 39 is supported.

Furthermore, since the lower skeleton 74 includes the dash panel lower 17, the dash panel upper 38 is glued to the upper end of the dash panel lower 17, and the extension part 24 abuts against the flange portion 17a at the upper end of the dash panel lower 17 via the sealing material 27 (see FIG. 4 and FIG. 5 (C)), it is possible to ensure waterproofing between an engine compartment and a cabin. Moreover, since the vertical wall 38b extending downward and the horizontal wall 38c extending outward in the vehicle width direction from the lower end of the vertical wall 38b are formed at the outer end in the vehicle width direction of the dash panel upper 38, the extension part 24 engages with the vertical wall 38b and the horizontal wall 38c via the latching claws 24e and 24f (see FIG. 4 and FIG. 5 (A)), and the fourth wall face 24d abuts against the vertical wall 38b via the sealing material 26 (see FIG. 4 and FIG. 5 (C)), it is easy to position the extension part 24 with respect to the dash panel upper 38 and it is possible to ensure waterproofing between the engine compartment and the cabin.

Moreover, since the lower skeleton 74 includes the front pillar lower 13 fixed to the rear face of the dash panel lower 17, and the front metal joint 62 is fastened by means of the front bolts 65 and the rear bolts 67 so as to straddle the front metal bracket 64 provided on the front face of the dash panel lower 17 and the rear metal bracket 66 provided on the rear face of the front pillar lower 13 (see FIG. 2), it is possible to strongly fix the front metal joint 62 to the lower skeleton 74, thus enhancing the strength with which the front end of the roof side rail 16 is supported.

Steps involved in assembling the automobile body are now explained by reference to FIG. 8.

The pair of left and right roof side rails 16 and 16, the roll bar 34, and the front roof arch 28 are integrally joined to thus assemble the upper skeleton 73, and the pair of left and right side members 30 and 30 are joined to this upper skeleton 73 to thus assemble a subcomponent 75 (see FIG. 8 (A)). The upper skeleton 73 and the side members 30 and 30 are bolted together via the front metal joints 62 and 62 at the front ends of the roof side rails 16 and 16, the metal joints 51 to 53 and 51 to 53 at the left and right lower ends of the roll bar 34, and the rear metal joints 68 and 68 at the rear ends of the roof side rails 16 and 16 (see FIG. 1).

Subsequently, the side members 30 and 30 of the subcomponent 75 are glued to an assembly of the vehicle body floor 11, the dash panel lower 17, and the rear partition wall 18 (see FIG. 8 (B)), thus integrating the upper skeleton 73 and the lower skeleton 74 (see FIG. 8 (C)). The lower skeleton 74 is formed from the vehicle body floor 11, the dash panel lower 17, the rear partition wall 18, and the side members 30 and 30.

Subsequently, the bolting together is undone so as to detach the upper skeleton 73 from the lower skeleton 74 (see FIG. 8 (D)), a component such as the roof panel 76 is assembled to the upper skeleton 73, and components such as damper housings 77 and 77, the front side frames 21 and 21, and a front bulkhead 78 are assembled to the lower skeleton 74 (see FIG. 8 (E)). The upper skeleton 73 and the lower skeleton 74, to which the components have been assembled, are bolted together again (see FIG. 8 (F)), and a component such as the windshield 39 is finally assembled, thus completing the automobile body (see FIG. 8 (G)).

As described above, since the upper skeleton 73 and the lower skeleton 74 are detachably bolted together, the lower skeleton 74 does not interfere when a component is assembled to the upper skeleton 73, and the upper skeleton 73 does not interfere when a component is assembled to the lower skeleton 74, thus not only improving the productivity, but also enabling joining and separation of the upper skeleton 73 and the lower skeleton 74 to be easily carried out due to them being bolted together.

An embodiment of the present invention is explained above, but the present invention may be modified in a variety of ways as long as the modifications do not depart from the spirit and scope thereof.

For example, the shape of the extension part 24 is not limited to that in the embodiment.

The invention claimed is:

1. An automobile body in which a lower skeleton that is formed into a bathtub shape using a carbon fiber-reinforced plastic (CFRP) and comprises at least a dash panel upper and an upper skeleton that comprises at least a front roof arch and a pair of left and right roof side rails are formed so that the lower skeleton and the upper skeleton can be separated from each other, and a rectangular windshield joining face that supports a windshield is formed so as to straddle the dash panel upper, the pair of left and right roof side rails, and the front roof arch, wherein a pair of left and right extension parts that extend toward a vehicle width direction inner side and are connected to vehicle width direction outer ends of the dash panel upper are provided at lower ends of the pair of left and right roof side rails, and a windshield joining face that supports part of the windshield is formed on the pair of left and right extension parts.

2. The automobile body according to claim 1, wherein the extension part comprises an L-shaped first wall face that has a first portion extending in the vehicle width direction and a second portion extending in afore-and-aft direction and is disposed in parallel to the windshield, a second wall face that extends downward from the first portion of the first wall face, and a third wall face that extends downward from the second portion of the first wall face, the first wall face and the third wall face are fixed to a metal joint that is provided on the lower skeleton and supports a front end of the roof side rail, and part of the windshield is supported on the first wall face.

3. The automobile body according to claim 2, wherein the lower skeleton comprises a dash panel lower, the dash panel upper is glued to an upper end of the dash panel lower, and the extension part abuts against the upper end of the dash panel lower via a sealing material.

4. The automobile body according to claim 3, wherein a vertical wall and a horizontal wall are formed at the vehicle width direction outer end of the dash panel upper, the vertical wall extending downward and the horizontal wall extending outside in the vehicle width direction from the lower end of the vertical wall, and the extension part engages with the vertical wall and the horizontal wall via a latching claw and abuts against the vertical wall via a sealing material.

5. The automobile body according to claim 3, wherein the lower skeleton comprises a front pillar lower that is fixed to a rear face of the dash panel lower, and the metal joint is fastened by a bolt so as to straddle a front metal bracket that is provided on a front face of the dash panel lower and a rear metal bracket that is provided on a rear face of the front pillar lower.

6. A method for manufacturing the automobile body according to claim 1, the method comprising a step of separating the upper skeleton from the lower skeleton, a step of assembling a component to each of the separated upper skeleton and lower skeleton, and a step of re-bolting together the upper skeleton and the lower skeleton, to which the assembling of the component has been completed.

7. The automobile body according to claim 4, wherein the lower skeleton comprises a front pillar lower that is fixed to a rear face of the dash panel lower, and the metal joint is fastened by a bolt so as to straddle a front metal bracket that is provided on a front face of the dash panel lower and a rear metal bracket that is provided on a rear face of the front pillar lower.

* * * * *